United States Patent
Barak et al.

(10) Patent No.: US 6,741,701 B1
(45) Date of Patent: May 25, 2004

(54) DUAL ECHO CANCELLER AND METHOD FOR INCREASING DYNAMIC RANGE OF A RECEIVER

(75) Inventors: Ehud Barak, Ocean Township, NJ (US); Ehud Langberg, Wayside, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 386 days.

(21) Appl. No.: 10/014,315

(22) Filed: Dec. 11, 2001

Related U.S. Application Data
(60) Provisional application No. 60/255,602, filed on Dec. 14, 2000.

(51) Int. Cl.$^7$ ................................. H04M 1/00
(52) U.S. Cl. ................... 379/406.01; 370/286
(58) Field of Search ................. 379/406.01, 406.02, 379/406.06, 406.08; 370/286, 289

(56) References Cited

U.S. PATENT DOCUMENTS

| | | | |
|---|---|---|---|
| 5,917,809 A | * 6/1999 | Ribner et al. | 379/406.06 |
| 6,421,377 B1 | * 7/2002 | Langberg et al. | 379/406.08 |
| 6,625,279 B1 | * 9/2003 | Eom | 379/406.01 |

* cited by examiner

Primary Examiner—Minsun Oh Harvey
Assistant Examiner—Jefferey Harold
(74) Attorney, Agent, or Firm—Thomas, Kayden, Horstemeyer & Risley

(57) ABSTRACT

In accordance with one aspect of the invention, an apparatus is provided having a transmit path and a receive path for communicating data. The apparatus includes an analog to digital (A/D) converter that is disposed in communication with the receive path. The A/D converter operates at a first sampling rate, and it converts a received analog signal into a digital signal. The apparatus also includes a first echo canceller that is in communication with the receive path and that operates at the first sampling rate for estimating a first portion of an echo signal leaking from the transmit path to the receive path. The estimated echo signal is subtracted from the digital signal. The amplitude of the digital signal is increased by a digital gain. A decimator is disposed in communication with the receive path, whereby the decimator filters the digital signal that has a first sampling rate and emits a signal output at a reduced sampling rate. Thereafter, a second echo canceller is in communication with the output from the decimator for generating an echo replica estimation of a second portion of echo signal leaking from said transmit path to said receive path. The second portion of echo signal leaking from said transmit path to said receive path is subtracted from the output from the decimator. The result is a substantially echo-free digital data signal.

20 Claims, 6 Drawing Sheets

DUAL ECHO CANCELLER AND METHOD FOR INCREASING DYNAMIC RANGE OF A RECEIVER

CROSS-REFERENCE TO RELATED APPLICATIONS

This application claims the benefit of U.S. Provisional Application Serial No. 60/255,602, filed Dec. 14, 2000, and entitled "Dual Echo Canceller Increases Dynamic Range of a Receiver," which is hereby incorporated by reference.

FIELD OF THE INVENTION

The present invention generally relates to data communications, and more particularly, to an apparatus and method for increasing the dynamic range of a receiver by implementing a double echo canceller at the input.

BACKGROUND OF THE INVENTION

In the field of data communications, a transceiver, or modem, is used to convey information from one location to another. Digital subscriber line (DSL) technology now enables DSL transceivers to more rapidly communicate data than previously possible with purely analog modems. DSL transceivers communicate by modulating a baseband signal carrying encoded digital data, converting the modulated digital data signal to an analog signal, and transmitting the analog signal over a conventional copper wire pair using techniques that are known in the art. These known techniques include mapping the information to be transmitted into a multi-dimensional multi-level signal space constellation and slicing the received constellation to recover the transmitted information. The constellation can include both analog and digital information or only digital information. FIG. 1 is a block diagram of a prior art communications system, wherein the transmitted signals in the two opposite directions are mixed and separated at the hybrid connectors.

Since DSL transceivers use the public switched telephone network (PSTN) and other similar networks, DSL systems are subject to echo cancellation problems with respect to voice band users of the PSTN. Echo is harmful to successful DSL signal delivery as it significantly degrades signal quality. Therefore, an echo cancellation technique should be employed to separate the upstream and downstream signals in DSL transceivers.

The dynamic range of the electrical components at the input of the receiver in a communications system may limit a receiver's performance. The dynamic range is determined by the maximum peak to peak allowed at the input and by the number of bits of, for example, an A/D converter at the input of the receiver. The performance is also limited by the quantization noise of the system, which is determined by the number of bits used in the various processes. If, for example, the resolution of the processor that follows the A/D is lower than the resolution of the A/D, the total resolution of the receiver is determined according to the processor's resolution. This may result in the loss of a substantial portion of a transmitted data signal. Because the range of the A/D can limit the performance of the receiver as a whole, there is a need to improve the dynamic range of the A/D thereby improving the dynamic range of the receiver itself.

The noise that may interfere with the communications system of FIG. 1 may result from echo in the system. Line echoes (i.e., electrical echoes) occur in telecommunications networks due to impedance mismatches at hybrid transformers that couple two-wire local customer loops to four-wire long-distance trunks. Ideally, the hybrid passes the far-end signal at the four-wire receive port through to the two-wire transmit port without allowing leakage into the four-wire transmit port. However, this would require exact knowledge of the impedance seen at the two-wire ports, which in practice varies widely from individual circuit to individual circuit and can only be estimated. Consequently, the leaking signal returns to the far-end transmitter as an echo. The situation can be further complicated by the presence of two-wire toll switches, allowing intermediate four-two-four wire conversions internal to the network. In telephone connections using satellite links, with round-trip delays on the order of 600 ms, line echoes can become particularly disruptive.

Additionally, echo and other noise may be generated as the result of bridge taps in the communications system. A bridge tap is an undetermined length of wire attached between the normal endpoints of a circuit that introduces unwanted impedance imbalances into a communications system. A bridge tap is not on the direct electrical path between the central office and a user's location. In situations involving bridge taps, the noise at the receiver may effectively cancel the transmitted signal.

Echo suppressors have been developed to control line echoes in telecommunications networks. Echo suppressors de-couple the four-wire transmit port when signal detectors determine that there is a far-end signal at the four-wire receive port without any near-end signal at the two-wire receive port. Echo suppressors, however, are generally ineffective during double-talk when speakers or modems at both ends of the system are talking or transmitting simultaneously. During double-talk, the four-wire transmit port carries both the near-end signal and the far-end echo signal. Furthermore, echo suppressors tend to produce speech clipping, especially during long delays caused by satellite links.

Echo cancellers generally include an adaptive filter and a subtracter. The adaptive filter attempts to model the echo path. The incoming signal is applied to the adaptive filter, which generates a replica signal. The replica signal and the echo signal are then applied to the subtracter. The subtracter removes the replica signal from the echo signal to produce an error signal. The error signal is fed back to the adaptive filter, which adjusts its filter coefficients (or taps) in order to minimize the error signal. In this manner, the filter coefficients converge toward values that optimize the replica signal in order to cancel (i.e., at least partially offset) the echo signal. Echo cancellers offer the advantage of not disrupting the signal path. Economic considerations place limits on the fineness of sampling times and quantization levels in digital adaptive filters, but technological improvements are relaxing these limits.

Echo occurs primarily because of the impedance mismatch between the hybrid connector and the two-wire phone line. An echo canceller operates by first estimating the parameters of the echo path, and then combining the estimate with the transmitted data, thus emulating the echo. This emulated echo (also referred to herein as echo replica) is then subtracted from the received signal, which ideally results in an echo-free transmission.

Accordingly, there is a need for a way to recover and preserve the transmitted signal that may be accompanied by a substantial amount of noise and echo. There is also a need to improve the dynamic resolution of the receiver to better protect the received signal that may otherwise be lost in the unwanted echo and noise. Accordingly, a solution that overcomes the shortcomings of the prior art is desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

In accordance with one aspect of the invention, an apparatus is provided having a transmit path and a receive path for communicating data. The apparatus includes an analog to digital (A/D) converter that is disposed in communication with the receive path. The A/D converter operates at a first sampling rate, and it converts a received analog signal into a digital signal. The apparatus also includes a first echo canceller that is in communication with the receive path and that operates at the first sampling rate for estimating a first portion of an echo signal leaking from the transmit path to the receive path. The estimated echo signal is subtracted from the digital signal. The amplitude of the digital signal is increased by a digital gain. A decimator is disposed in communication with the receive path, whereby the decimator filters the digital signal that has a first sampling rate and emits a signal output at a reduced sampling rate. Thereafter, a second echo canceller is in communication with the output from the decimator for generating an echo replica estimation of a second portion of the echo signal leaking from the transmit path to said receive path. The second portion of the echo signal leaking from the transmit path to the receive path is subtracted from the output from the decimator. The result is a substantially echo-free digital data signal.

In accordance with another aspect of the invention, a method for increasing the dynamic range in a receiver in a communications system is provided. The method includes the steps of receiving a analog signal on a receive path for communicating data. The received analog signal is converted to a digital signal at a first sampling rate. An estimation of a first portion of an echo signal leaking from a transmit path in the receiver to the receive path is made and subtracted from the converted digital signal. The sampling rate of the converted digital signal is thereafter reduced to a predetermined sampling rate. An estimation of a second portion of an echo signal leaking from the transmit path in the receiver to the receive path is made. This second portion of the echo signal is subtracted from the converted digital signal at the reduced sampling rate.

BRIEF DESCRIPTION OF THE DRAWINGS:

The accompanying drawings incorporated in and forming a part of the specification, illustrate several aspects of the present invention, and together with the description serve to explain the principles of the invention. In the drawings.

DETAILED DESCRIPTION OF PREFERRED EMBODIMENT

Figure 1:
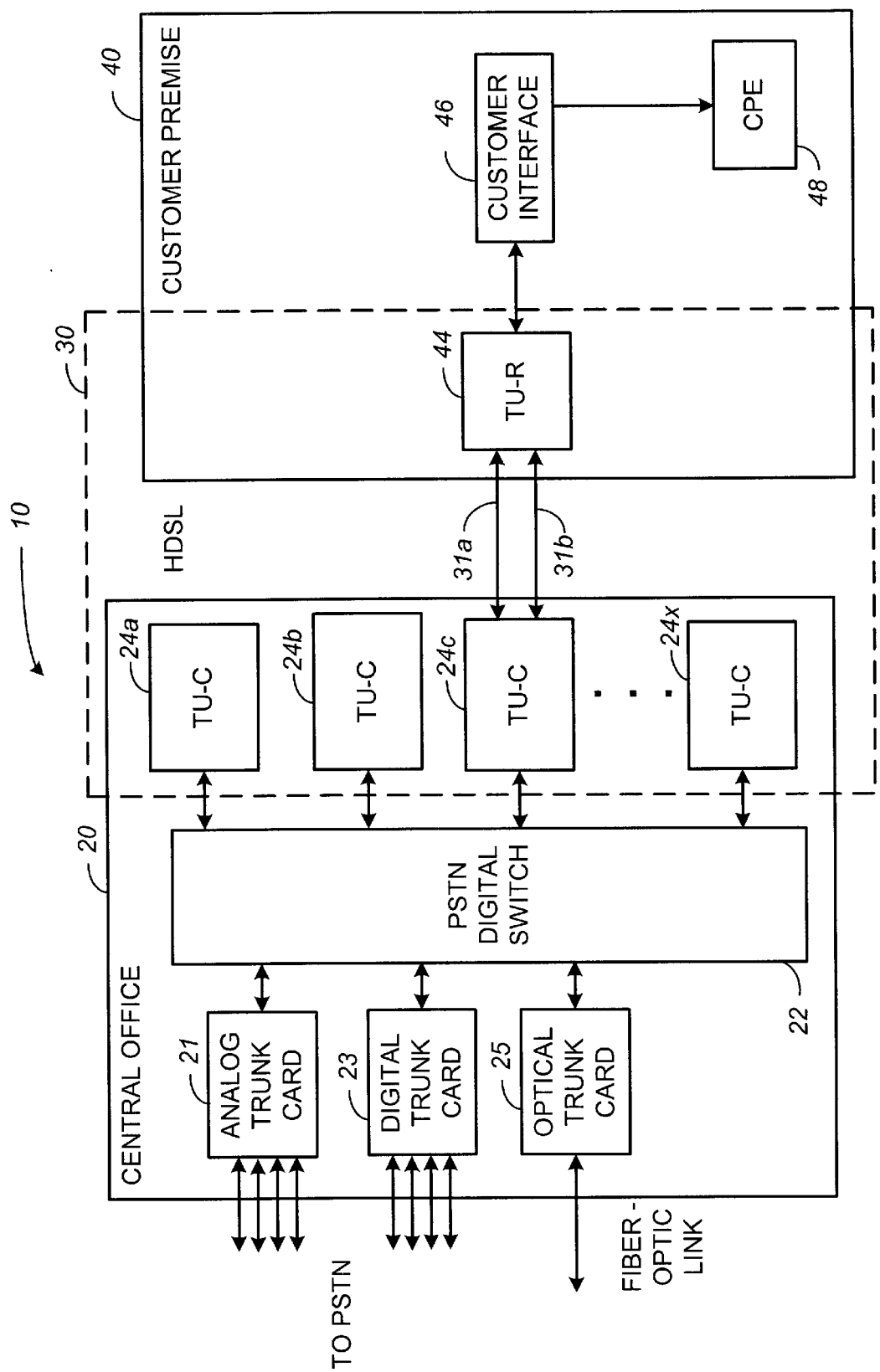
FIG. 1 is a schematic diagram illustrating a symmetric high-bit rate DSL (SHDSL) communication system.

Having summarized the invention above, reference is now made in detail to the description of the receiver as illustrated in the drawings. While the receiver will be described in connection with these drawings, there is no intent to limit it to the embodiment or embodiments disclosed therein. On the contrary, the intent is to cover all alternatives, modifications and equivalents included within the spirit and scope defined by the appended claims.

The echo cancellers shown in the figures can be implemented in software, hardware, firmware, or a combination thereof. In the preferred embodiment, the elements of the dual echo cancellers are implemented in hardware within the various circuit components of an application specific integrated circuit (ASIC) such as a suitably configured digital signal processor (DSP). In an alternative embodiment, the dual echo cancellers may be implemented in software that is stored in a memory and that configures and drives a suitable DSP. Moreover, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

While the foregoing preferred embodiment illustrates the dual echo cancellers in the context of a symmetric high-bit-rate DSL (SHDSL) remote transceiver, the echo cancellers are applicable to symmetric DSL transceivers and like devices configured to support SDSL, SHDSL2, and similar communication protocols.

The SHDSL link illustrated in FIG. 1 is offered by way of example to highlight various interface equipment that may be used to provide a T1 capacity link between a PSTN central office (CO) and a customer premise (CP). In this regard, FIG. 1 illustrates a basic SHDSL network link architecture.

As illustrated in FIG. 1, a SHDSL network link 10 may comprise equipment located within a CO 20, equipment located within a CP 40, and SHDSL interface equipment 30 as required within each location to transfer data to and from the remainder of the PSTN (not shown). More specifically, the CO 20 may include a plurality of trunk line interfaces, herein labeled analog trunk card 21, digital trunk card 23, and optical trunk card 25, respectively; a PSTN digital switch 22; and a plurality of SHDSL transmission units—central office (TU-C) 24a, 24b, 24c, . . . 24x. As illustrated in FIG. 1, each TU-C 24a, 24b, 24c, . . . 24x may be coupled via one or two twisted-pair telephone transmission lines 31a, 31b to a dedicated SHDSL transmission unit—remote (TU-R) 44 (one shown for simplicity of illustration). As also illustrated in FIG. 1, the combination of the TU-C 24c, the twisted-pair telephone transmission lines 31a, 31b, and the TU-R 44 may comprise the SHDSL interface equipment 30. As further illustrated in FIG. 1, the CP 40 may comprise a customer interface 46 and customer premise equipment 48 which may contain one or more computing devices (not shown).

It is significant to note that downstream and upstream data transmissions that are transmitted across the SHDSL network link 10 of FIG. 1 are processed at the TU-Rs 44 and the TU-Cs 24 in order to ensure that data transmissions are inverse multiplexed and reconstructed into their original configuration. Each of the TU-Rs 44 and the TU-Cs 24 may further comprise a transceiver and a mapper (both not shown). At one end of the SHDSL communications network 10, a first mapper may be used to inverse multiplex or distribute a data transmission across multiple transmit media (i.e., the twisted-pair telephone transmission lines 31a, 31b). At the opposite or receiving end of the SHDSL communications network 10, a second mapper may be used to multiplex or reconstruct the original data transmission.

For example, a downstream data transmission or a data transmission from a CO 20 to a CP 40 may be inverse multiplexed such that a portion of the data is transmitted via the TU-C 24c across a first twisted pair telephone transmission line 31a with the remaining portion of the data transmission sent via a second twisted pair telephone transmission line 31b. After the first and second portions of the data transmission are received and reconstructed by the TU-R 44, the first and second portions of the original data stream may be multiplexed before being forwarded to the customer interface 46 and the CPE 48. Often the customer interface 46 is implemented with a router (not shown) having a port coupled with one or more TU-Rs 44 and or other network interface devices.

Figure 2:
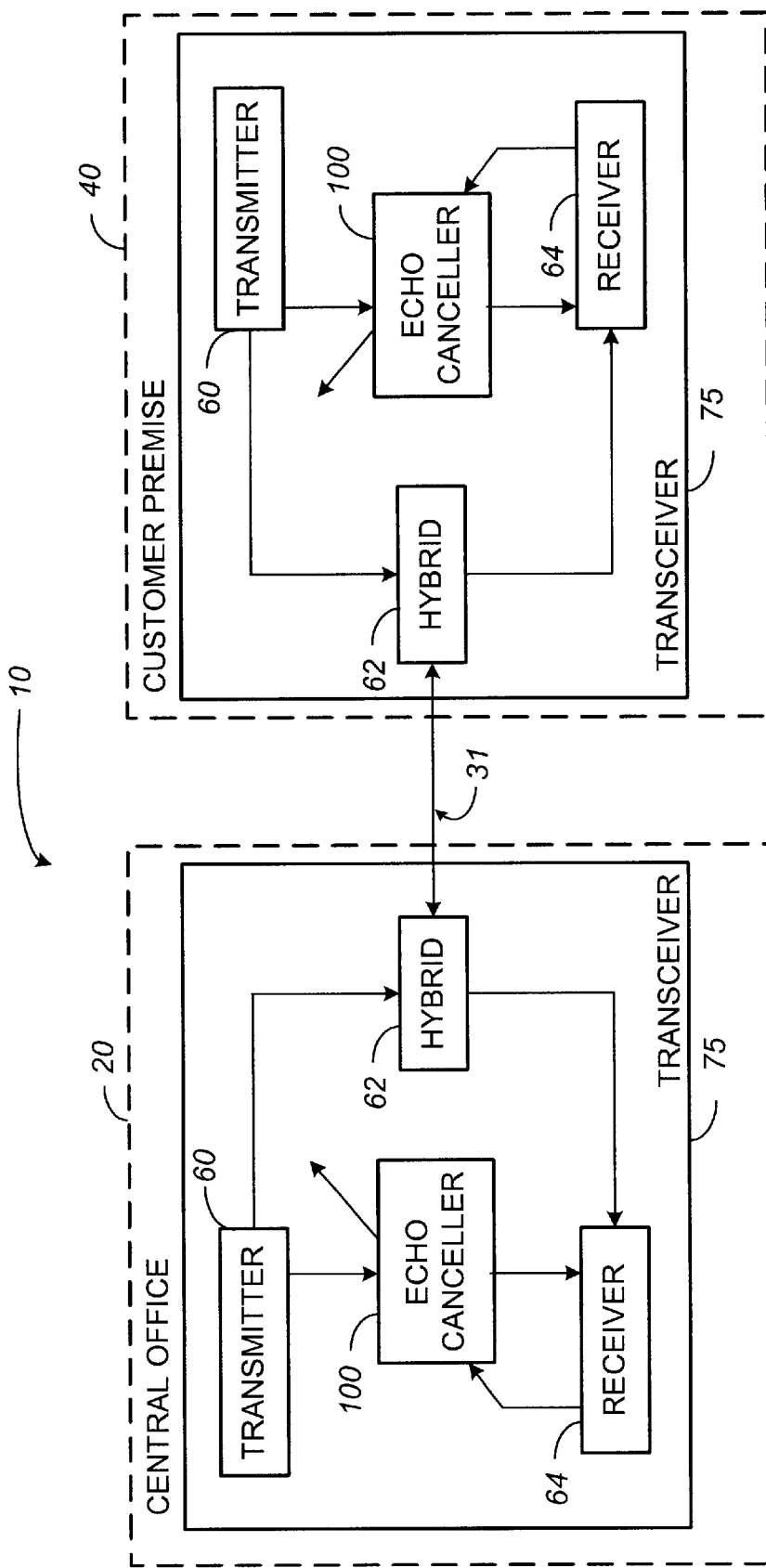
FIG. 2 is a schematic diagram illustrating the location of a hybrid and of an echo canceller in transceivers of the SHDSL communication system of FIG. 1.

As illustrated in FIG. 2, a SHDSL network link 10 may include a first transceiver 75 located within a CO 20 and a similarly configured transceiver 75 located within a CP 40. More specifically, the CO 20 may include a transmitter 60, a hybrid 62, a receiver 64 and an echo canceller 100. Transmitter 60 may be configured to supply a digitally encoded data stream consisting of a series of data symbols over time. As illustrated in the functional block diagram of FIG. 2, the transmitter output may be supplied to the hybrid 62, which couples the designated transmission signal on the twisted-pair telephone transmission line 31. Concurrently, the hybrid 62 may receive a remote data transmission from the CP 40 via the same twisted-pair telephone transmission line 31. The hybrid 62 provides limited echo attenuation before supplying the CO receiver 64 with the remote data transmission.

The hybrid 62 provides limited echo cancellation or attenuation due to the uncertain twisted pair loop impedance across the frequency band in use. As a result, local transmission echo (i.e., that portion of the transmit signal from CO transmitter 60 that arrives at the receiver 64 via hybrid 62) should be digitally reduced or filtered in order to maximize transceiver 75 performance. As illustrated in the functional block diagram of FIG. 2, echo canceller 100 is inserted in parallel with the echo path.

The echo canceller 100 synthesizes the echo path signal (described hereinafter with regard to FIG. 3) to produce an echo replica with the same data that is applied to the transmitter 60, but with a reversed sign to cancel the real echo at receiver 64. As further illustrated in FIG. 2, a similarly configured transceiver 75 may be found within CP 40.

Figure 3:
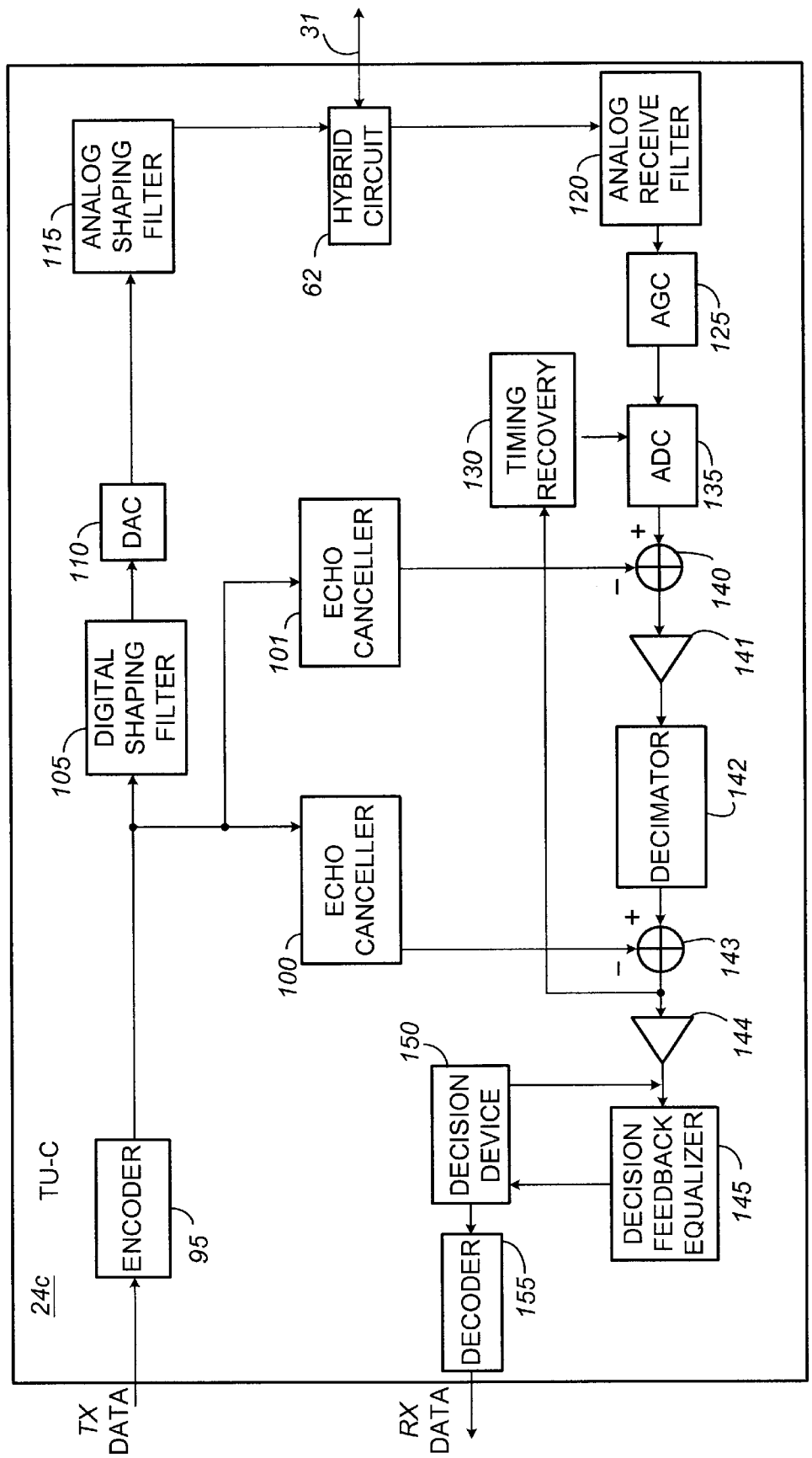
FIG. 3 is a functional block diagram further illustrating the symmetric high-bit rate transmission unit of the communication system of FIG. 1.

Reference is now directed to FIG. 3, which presents a functional block diagram further illustrating the high-bit rate transmission unit of the communication system of FIG. 1. As shown in FIG. 3, a SHDSL transmission unit—central office (TU-C) 24c may be configured to receive a locally generated transmit signal (i.e., TX data) that the TU-C 24c encodes, filters, and processes before coupling the transmit signal to the twisted-pair telephone transmission line 31 via hybrid 62. Similarly, the TU-C 24c is configured to receive a remotely generated transmit signal (i.e., RX data) that the TU-C 24c recovers, filters, and decodes before forwarding the receive signal to other devices in the CO 20 (not shown).

As further illustrated in FIG. 3, the TU-C 24c may comprise an encoder 95, a digital shaping filter 105, a digital to analog converter (DAC) 110, an analog shaping filter 115, and a hybrid circuit 62 in the upstream data path. Conversely, a TU-C 24c may comprise a hybrid circuit 62, an analog receive filter 120, an automatic gain control amplifier (AGC) 125, a timing recovery circuit 130, an analog to digital converter (ADC) 135, echo cancellers 100, 101, a decimator 142, summers 140, 143, digital gains 141, 144, a decision feedback equalizer 145, a decision device 150, and a decoder 155 in the downstream data path.

In this regard, the upstream data transmission portion of the TU-C 24c may function as follows. The bits of the digital data input signal may be encoded into a data symbol in encoder 95. The data symbols encoded over time may be forwarded to the digital shaping filter 105 and the pair of echo cancellers 100, 101. Digital shaping filter 105 may take the form of a finite impulse response (FIR) filter selected for shaping the frequency spectrum across a particular SHDSL communication channel. The output of the digital shaping filter 105 may then be forwarded to DAC 110.

The TU-C 24c, having converted the digitally filtered data symbols representing the digital input data stream in DAC 110 to an analog signal, the analog representation of the digital data input stream may be further processed by an analog shaping filter 115. In this regard, analog shaping filter 115 may take the form of a low-pass filter to control out-of-band energy present in the analog signal. The filtered transmit signal may then be coupled to the twisted pair telephone transmission line 31 via hybrid circuit 62. Hybrid circuit 62 may comprise two unidirectional ports (one for data transmission and one for data reception) and one bi-directional port. The bi-directional port may be integrated with the twisted-pair telephone transmission line 31. If the impedance of the twisted-pair matches the design impedance of the hybrid 62, there will be perfect isolation between the transmitting and receiving ports within hybrid circuit 62. For this ideal case, the hybrid circuit 62 return loss is infinity. In reality, the line impedance varies with frequency as described above and varies significantly between individual twisted-pair telephone transmission lines 31 within the PSTN.

The downstream (i.e., the CO 20 to CP 40) functional operation of TU-C 24c having been briefly described, reference will now be directed to upstream (i.e., CP 40 to CO 20) data transmissions within TU-C 24c. The function of the analog receive filter 120, like its counterpart in the transmission path of TU-C 24c, is to reduce out-of-band noise.

The TU-C 24c, having removed the high-frequency out-of-band noise from the receive or upstream channel with the analog receive filter 120, may forward the filtered analog data stream to the AGC 125. AGC 125 brings the received signal magnitude to that close to the normal transmit signal level for subsequent digital conversion and processing.

The TU-C 24c, having adjusted the magnitude of the received signal in AGC 125, may then process the filtered and amplified receive signal via timing recovery circuit 130. Timing recovery circuit 130 typically coordinates the sampling clocks used to process data in both DAC 110 in the upstream data path, as well as, ADC 135 in the receive data path. ADC 135 may be synchronized to the DAC 110 through the timing recovery circuit 130 such that upstream and downstream data symbols are synchronized within the TU-C 24c.

Once the received data has been converted to a digital data stream in ADC 135, within the TU-C 24c upstream data path, digital signal processing of the data symbols encoded within the received signal path may commence. After analog to digital conversion, the output of the echo canceller 101 from the upstream data path may be mathematically combined with the received signal. The combination may take place in summer 140.

Echo canceller 101 may be designed to resemble the equivalence of the echo path as defined by both the digital and analog shaping filters 105, 115, the DAC 110, the hybrid circuit 62, the analog receive filter 120, the AGC 125, the timing recovery circuit 130, and the ADC 135. In typical configurations, the echo path transfer function is identified with an adaptive signal-processing algorithm that is applied to a digital FIR filter. Although discussed in more detail below, echo canceller 101 operates at the same symbol rate as ADC 135. Additionally, echo canceller 101 is configured to cover part of the echo so as to reduce the signal amplitude at the input of the decimator 142.

Digital filtering is the processing of a time-domain signal resulting in some change in that signal's original spectral content. The change is usually a reduction of some unwanted input spectral components; that is, filters allow certain frequencies to pass while attenuating other frequencies.

FIR filters use only current and past input samples, and none of the filter's previous output samples, to obtain a current output sample value. Because sudden transitions in the time sequence represent high frequency components, the average sample value behaves like a low-pass filter smoothing sudden changes in the input. Two factors affect a FIR filter's frequency response: (1) the number of taps; and (2) the specific values used for multiplication coefficients.

The TU-C 24c may then forward the digitized and partially echo-canceled received signal to a digital gain 141. The digital gain operates to increase the signal by, as a non-limiting example, 6 dB or 12 dB, without clipping. The digital gain 141 allows the data signal to be amplified after the echo is removed by summer 140 so that no resolution is lost in the process.

The TU-C 24c thereafter forwards the digitized received signal to a decimator 142 to reduce the sampling rate. The decimator 142 filters the received signal at a first sampling rate and emits a signal output to the summer 143 at a second, reduced sampling rate. A preferred embodiment, among others, for the decimator is a 3 to 1 reduction ratio; however, one of ordinary skill in the art would know that other decimation ratios may work equally well.

After the received signal's sampling rate is reduced by decimator 142, the output of the echo canceller 100 from the upstream data path is mathematically combined with the received signal emitted from the decimator 142. The combination may take place in summer 143.

Echo canceller 100, like echo canceller 101, is designed to resemble the equivalence of the echo path as defined by both the digital and analog shaping filters 105, 115, the DAC 110, the hybrid circuit 62, the analog receive filter 120, the AGC 125, the timing recovery circuit 130, the ADC 135, the summer 140, the digital gain 141, and the decimator 142. In typical configurations, the echo path transfer function is identified with an adaptive signal-processing algorithm that is applied to a digital FIR filter. Additionally, echo canceller 100 operates at the reduced sampling rate rather than the higher sampling rate that occurs in echo canceller 101. Furthermore, as echo canceller 101 is configured to remove part of the echo, echo canceller 100 may be configured to remove any remaining echo or a separate portion of the echo.

Upon the remaining echo being removed by summer 143, the received signal is forwarded to a second digital gain 144 that, like gain 141, operates to increase the amplitude of the received signal. It is not unusual that a substantial portion of the received signal's amplitude is attributable to echo and quantization noise that, once removed, enables the buried data signal to be amplified for further processing.

Output from the digital gain 144 is forwarded to the decision feedback equalizer 145 before being forwarded to the decision device 150. The decision feedback equalizer 145 may comprise a feed-forward filter and a feedback filter. The feed-forward filter equalizes the precursor of the twisted-pair telephone transmission line 31 loop channel impulse response, while the feedback filter, cancels the effect of the post-cursor of the channel impulse response. The decision feedback equalizer is used for the TU-C 24c to maintain minimal noise enhancement during the channel equalization process. Decision device 150 may take the form of a threshold detector configured to correspond to the discrete voltage levels used by the line code. After signal processing in the decision device 150, received symbols are converted back into signal bits in decoder 155 to create a digital data bit stream.

Figure 4:
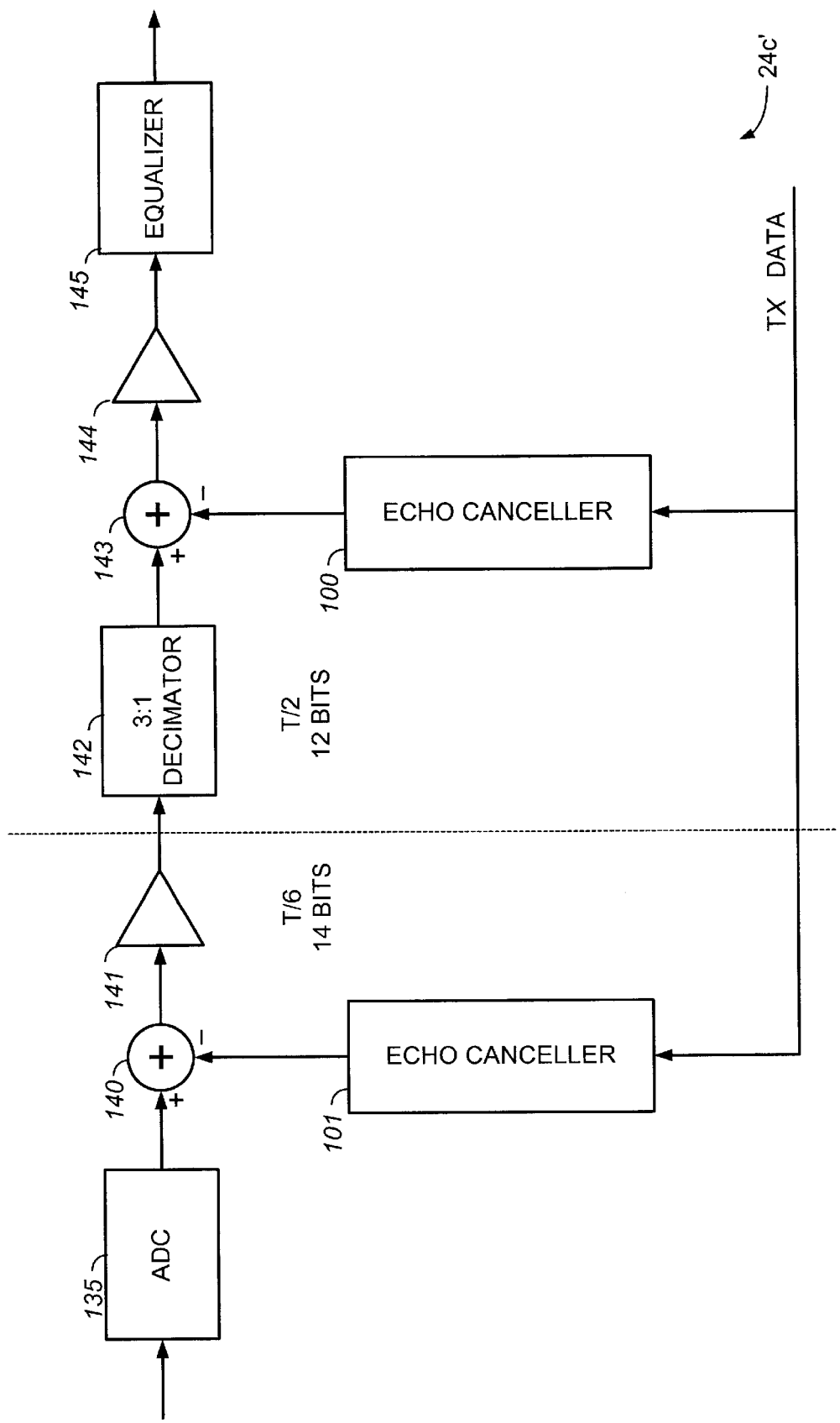
FIG. 4 is a block diagram of select components in transmission unit of FIG. 3.

FIG. 4 is a block diagram of select components in TU-C 24c' of FIG. 3 to further depict the effect the dual echo cancellers on the transmission unit. Echo canceller 101, as described above, operates at the same symbol rate as ADC 135. As a non limiting example as shown in FIG. 4, the ADC may be configured as a 14 bit converter and may furthermore be configured to run at a first symbol rate, such as T/6. Also in this non-limiting example, decimator 142 is configured to decimate the data by a factor of three (T/2). Decimator 142, in this non-limiting example, has a 12 bit resolution. Without the inclusion of echo canceller 101 in the transmission unit 24c', two least significant bits are lost. As stated above, since the actual signal may be practically lost in the received signal that may experience substantial echo from bridge-taps, etc., it is likely that the two lost bits are bits of transmitted data rather than unimportant noise or echo.

However, the configuration depicted in FIG. 4 operates to retain those least significant bits of data that may otherwise be lost. Echo canceller 101, as described above, operates at the same symbol rate and resolution as ADC 135, which, according to the non-limiting example depicted in FIG. 4, is T/6 and 14 bits respectively. As a non-limiting example, echo canceller 101 covers 10 bauds and therefore has 60 taps. It operates to remove merely part of the echo in the received signal that exits ADC 135. However, it is so configured so that it removes a substantial amount of the signal that is not carrying data. The resulting signal that leaves summer 140, after the echo is removed, is significantly less in amplitude than the signal from 140. As a non-limiting example, the resulting change in signal amplitude may be 20 dB or more.

To make the resulting signal more workable, it is passed through digital gain 141, which, as a non-limiting example, may add as much as 6 to 12 dB back to the partially echo-free signal that leaves summer 140. Nevertheless, one of ordinary skill in the art will recognize that the digital gain may be set to amplify the signal leaving summer 140 by practically any amount desired. Consequently, the stated gain of 6 to 12 dB is merely an example and not a controlling range of acceptable gain values.

Figure 6:
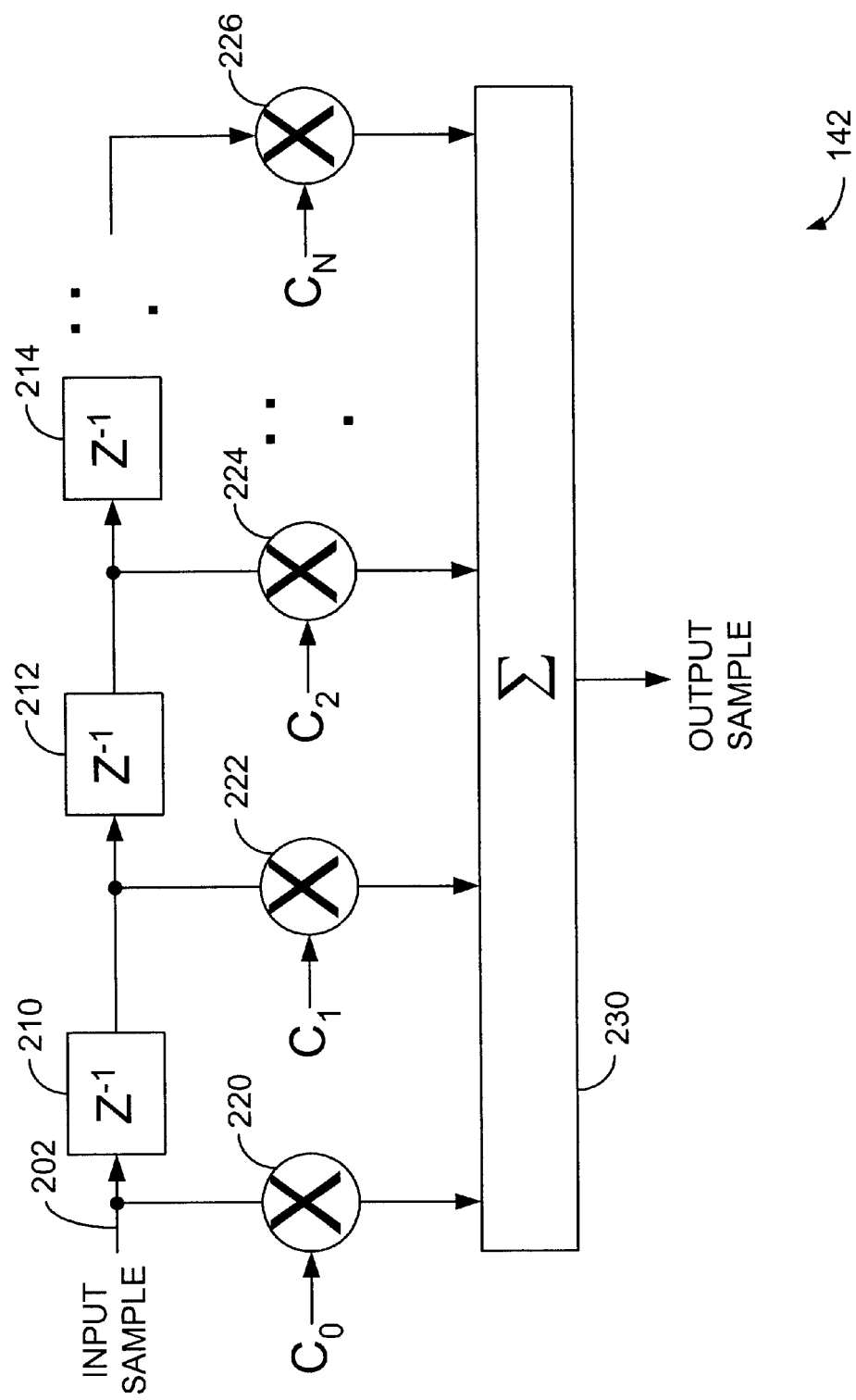
FIG. 6 is a schematic of a decimator that may be used in the transmission unit of FIG. 3.

From gain 141, the received and now amplified signal is processed by decimator 142. Decimator 142, as described above, reduces the sampling rate by a preconfigured amount. In the non-limiting example depicted in FIG. 4, decimator 142 has a 3 to 1 ratio so that the output symbol rate is T/2. Also in this non-limiting example, the resolution of decimator 142 is 12 bits. The internal structure of decimator 142 is described in more detail below and is shown in FIG. 6.

Echo canceller 100 operates at T/2 just like decimator 142. Echo canceller 100 operates to remove a remaining portion of the echo not extracted by echo canceller 101. The estimated echo is subtracted from summer 143, and the resulting signal is again amplified by a digital gain 144 so as to produce a completely echo-free signal to equalizer 145. Additionally, no bits of the data signal are lost because of the dual echo cancellers 100, 101 operating at different symbol rates.

A FIR filter performs time domain convolution by summing the products of shifted input samples of a digital data stream and a sequence of filter coefficients. A FIR filter's output sequence is equal to the convolution of the input data stream and the filter's impulse response. Moreover, a FIR filter's output spectrum is the product of the input spectrum and the filter's frequency response. This result is expected because convolution in the time domain and multiplication in the frequency domain are Fourier transform pairs. The following equation describes the convolution operator or FIR filtering:

$$y[m] = \sum_{n=0}^{N-1} (h[n] * x[m-n]) \quad 0 \le m < N-1. \quad \text{Eq. 1}$$

Figure 5:
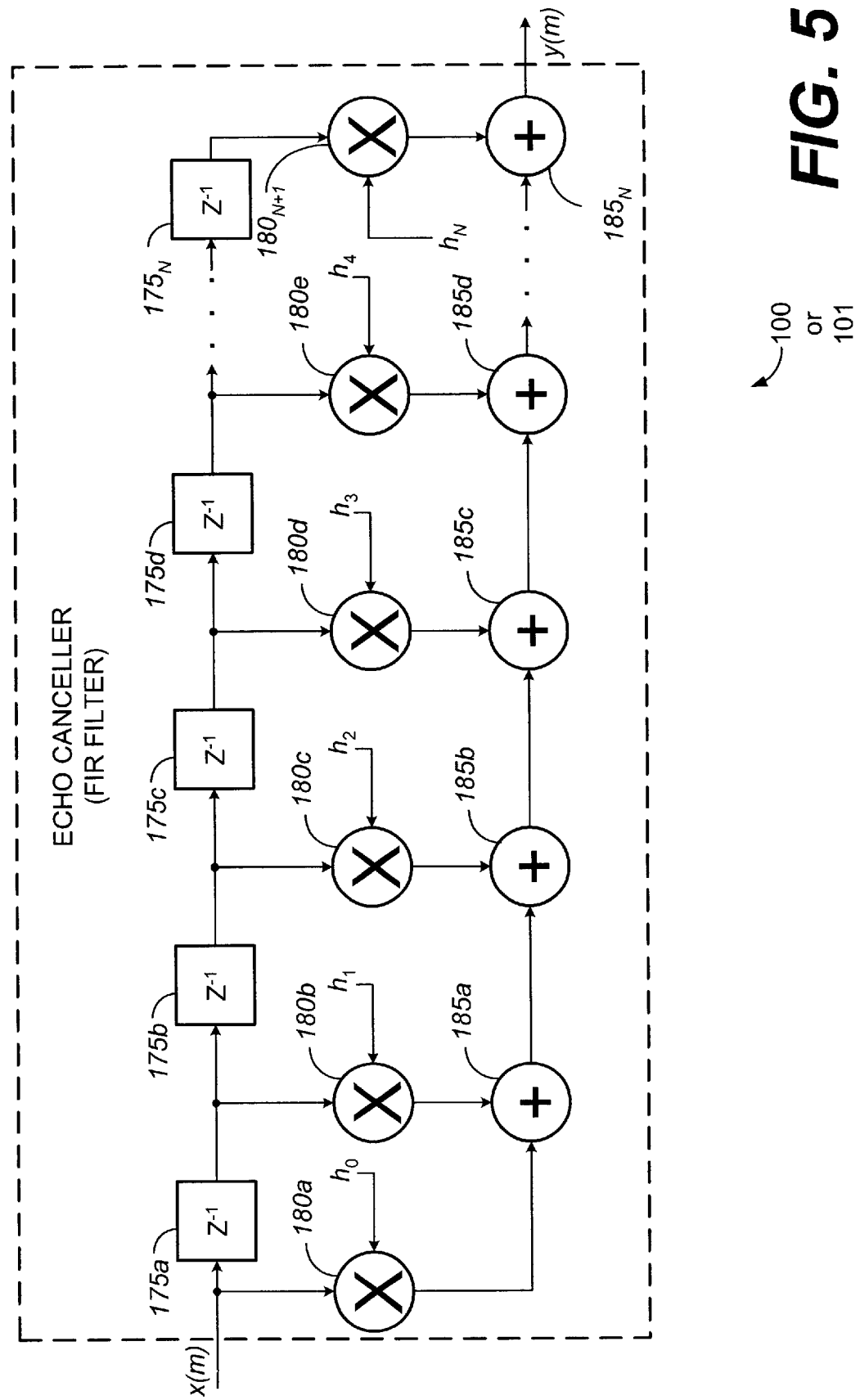
FIG. 5 is a schematic of an echo canceller that may be used in the transmission unit of FIG. 3.

The process is shown more clearly in the echo canceller 100, 101 (or FIR filter) of FIG. 5. In this regard, a conventional echo canceller 100 (hereinafter referred to as reference number 100 in the form of a FIR filter may have an input configured to receive a digital data stream, x(m), and an output, y(m), configured to forward the filtered digital data stream to downstream devices.

As illustrated in FIG. 5, the input may be coupled to a first delay element 175a and a first multiplier 180a. The input after having been processed by the first delay element 175a may be forwarded to a second delay element 175b and a second multiplier 180b. The first multiplier 180a is configured to multiply a first coefficient, $h_0$, to the input data. The first multiplier result is then coupled to an input of a first adder 185a. The second multiplier 180b is configured to multiply a second coefficient, $h_1$, to the output of the first delay element 175a. The second multiplier result is also coupled to an input of the first adder 185a. Moreover, the output from the second delay element 175b is coupled to a third delay element 175c and a third multiplier 180c, which is configured to multiply a third coefficient, $h_2$, to the result from the second delay element 175b.

As further illustrated in FIG. 5 each subsequent delay element 175c, 175d, $175_N$ together with its associated multiplier 180d, 180e, . . . $180_{N+1}$, which is configured to apply (i.e., multiply) an associated coefficient (e.g., $h_3$, $h_4$, . . . $-h_N$) define a tap of the conventional echo canceller 100. As is also shown in FIG. 5, an output of the first adder 185a is coupled to an input of the second adder 185b and so on throughout the chain of N adders 185 configured to accumulate the results from the N taps of the filter. The output of each of the remaining taps is added to the series of results via each of the associated adders 185c, 185d, . . . $185_N$.

FIG. 6 is a block diagram illustrating the general structure of the decimator circuit 142. The input signal is delivered to the decimator 142 at 202, and is passed through a series of delay elements 210, 212, and 214. The taps, 220, 222, 224, 226, are interposed between each of the delay elements 210, 212, 214, which "tap" the intermediate signals. Each tap is multiplied by a coefficient value, denoted at $C_0$, $C_1$, $C_2$, . . . $C_N$. The outputs of the various taps 220, 222, 224, 226 are summed by a summer circuit 230, and the summation is output from the decimator circuit 142.

As will be appreciated from the foregoing discussion, various advantages are achieved by the system of the present invention. For example, the inventive system saves memory space required for echo cancellation, since the number of coefficients had been reduced to a fraction of the original number, as practiced by prior art systems. The invention, accordingly, saves computations (and therefore time), since the sampling frequency has been reduced to a fraction of the original, as practiced by prior art systems. The savings of memory and computations translate into saving in power consumption that is another essential consideration in DSL applications.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated.

What is claimed is:

1. An apparatus for increasing the dynamic range of a receiver in a communications system, comprising:
   a transmit path and a receive path for communicating data;
   an analog to digital (A/D) converter disposed in communication with the receive path, wherein the AID converter operates at a first sampling rate;
   a first echo canceller in communication with the receive path that operates at the first sampling rate for estimating a portion of an echo signal leaking from the transmit path to the receive path;
   a decimator disposed in communication with the receive path, whereby the decimator filters an incoming signal having the first sampling rate on the receive path and emits a signal output at a reduced sampling rate; and
   a second echo canceller in communication with the output from the decimator for generating an echo replica estimation of an echo signal leaking from the transmit path to the receive path, wherein the second echo canceller operates at the reduced sampling rate and operates to estimate the remaining echo signal leaking from the transmit path to the receive path.

2. The apparatus of claim 1, further comprising:
   an adder disposed in communication with the receive path and configured to subtract the output of the first echo canceller from the output of the A/D converter; and
   an adder disposed in communication with the receive path and configured to subtract the output of the second echo canceller from the output of the decimator.

3. The apparatus of claim 2, further comprising:
   a digital gain disposed in communication with the receive path and configured to amplify the signal amplitude output from the first adder.

4. The apparatus of claim 3, wherein the signal amplitude is increased by the digital gain such that the signal communicated on the receive path is unclipped.

5. The apparatus of claim 2, further comprising:
   a digital gain disposed in communication with the receive path and configured to amplify the signal amplitude output from the second adder.

6. The apparatus of claim 1, wherein the resolution of the decimator is less than the resolution of the A/D converter.

7. The apparatus of claim 1, wherein the first echo canceller operates to reduce the signal amplitude input to the decimator.

8. The apparatus of claim 1, wherein the first and second portions of the echo signal comprise the complete echo signal present on the receive path.

9. The apparatus of claim 1, further comprising:
a computer in communication with the receiver and coupled to a network.

10. An method for increasing the dynamic range in a receiver in a communications system, comprising the steps of:
receiving an analog signal on a receive path for communicating data;
converting the received analog signal to a digital signal at a first sampling rate;
estimating a first portion of an echo signal leaking from a transmit path in the receiver to the receive path, wherein the first portion of the echo signal is subtracted from the converted digital signal;
reducing the first sampling rate of the converted digital signal to a reduced sampling rate; and
estimating a second portion of an echo signal leaking from the transmit path in the receiver to the receive path, wherein the second portion of the echo signal is subtracted from the converted digital signal at the reduced sampling rate.

11. The method of claim 10, further comprising the step of:
increasing the signal amplitude of the converted digital signal after the first portion of the echo signal is subtracted from the converted digital signal.

12. The method of claim 1, wherein the amplitude of the converted digital signal is increased by an amount whereby the converted digital signal is unclipped.

13. The method of claim 12, wherein the amplitude of the converted digital signal is increased by up to 12 dB.

14. The method of claim 10, further comprising the step of:
increasing the signal amplitude of the converted digital signal after the second portion of the echo signal is subtracted from the converted digital signal at the reduced sampling rate.

15. The method of claim 10, wherein the first echo portion subtracted from the converted digital signal reduces the amplitude converted digital signal by up to 12 dB.

16. The method of claim 10, wherein the sampling rate is reduced at a rate of three to one.

17. The method of claim 10, wherein the first and second portions of the echo signal comprise the complete echo signal present on the receive path.

18. An system for increasing the dynamic range in a receiver in a communications system, comprising:
a transmit path and a receive path for communicating data;
means for converting the received analog signal to a digital signal at a first sampling rate;
means for estimating a first portion of an echo signal leaking from a transmit path in the receiver to the receive path, wherein the first portion of the echo signal is subtracted from the converted digital signal;
means for reducing the first sampling rate of the converted digital signal to a reduced sampling rate; and
means for estimating a second portion of an echo signal leaking from the transmit path in the receiver to the receive path, wherein the second portion of the echo signal is subtracted from the converted digital signal at the reduced sampling rate.

19. The system of claim 18, further comprising the step of:
means for increasing the signal amplitude of the converted digital signal after the first portion of the echo signal is subtracted from the converted digital signal.

20. The system of claim 18, wherein the first and second portions of the echo signal comprise the complete echo signal present on the receive path.

* * * * *